United States Patent

[11] 3,633,626

[72] Inventors George T. Zirps
East Hanover;
Arthur C. Worley, Morristown, both of N.J.
[21] Appl. No. 67,844
[22] Filed Aug. 28, 1970
[45] Patented Jan. 11, 1972
[73] Assignee Esso Research and Engineering Company

[54] VERNIER THROTTLING/BLOCK VALVE
7 Claims, 4 Drawing Figs.
[52] U.S. Cl. .................................................. 137/637.3,
137/599.2, 251/305
[51] Int. Cl. .................................................. F16k 1/22
[50] Field of Search ........................................ 137/637.3,
637.5, 599.2; 251/305, 306

[56] References Cited
UNITED STATES PATENTS
2,209,397  7/1940  Gannestad.................... 137/637.3
2,412,918  12/1946  Sladky.......................... 251/305 X
2,912,881  11/1959  Imhoff.......................... 137/599.2 X Primary Examiner—Robert G. Nilson
Attorneys—Manahan and Wohlers and E. Donald Paris ABSTRACT: A butterfly valve of the vernier throttling/block type comprising a pivotably mounted auxiliary disc concentrically disposed within a separately pivotable main disc, each disc being provided with individual disc operator means for providing an independent and positively controllable method of throttle flow. This type of valve construction provides for a wide range of throttling capability as well as for tight shutoff. Further, any turbulence created will take place in the center of the fluid stream immediately downstream of the vernier disc such that there will be substantially no undesirable turbulence effects on the piping and associated equipment.

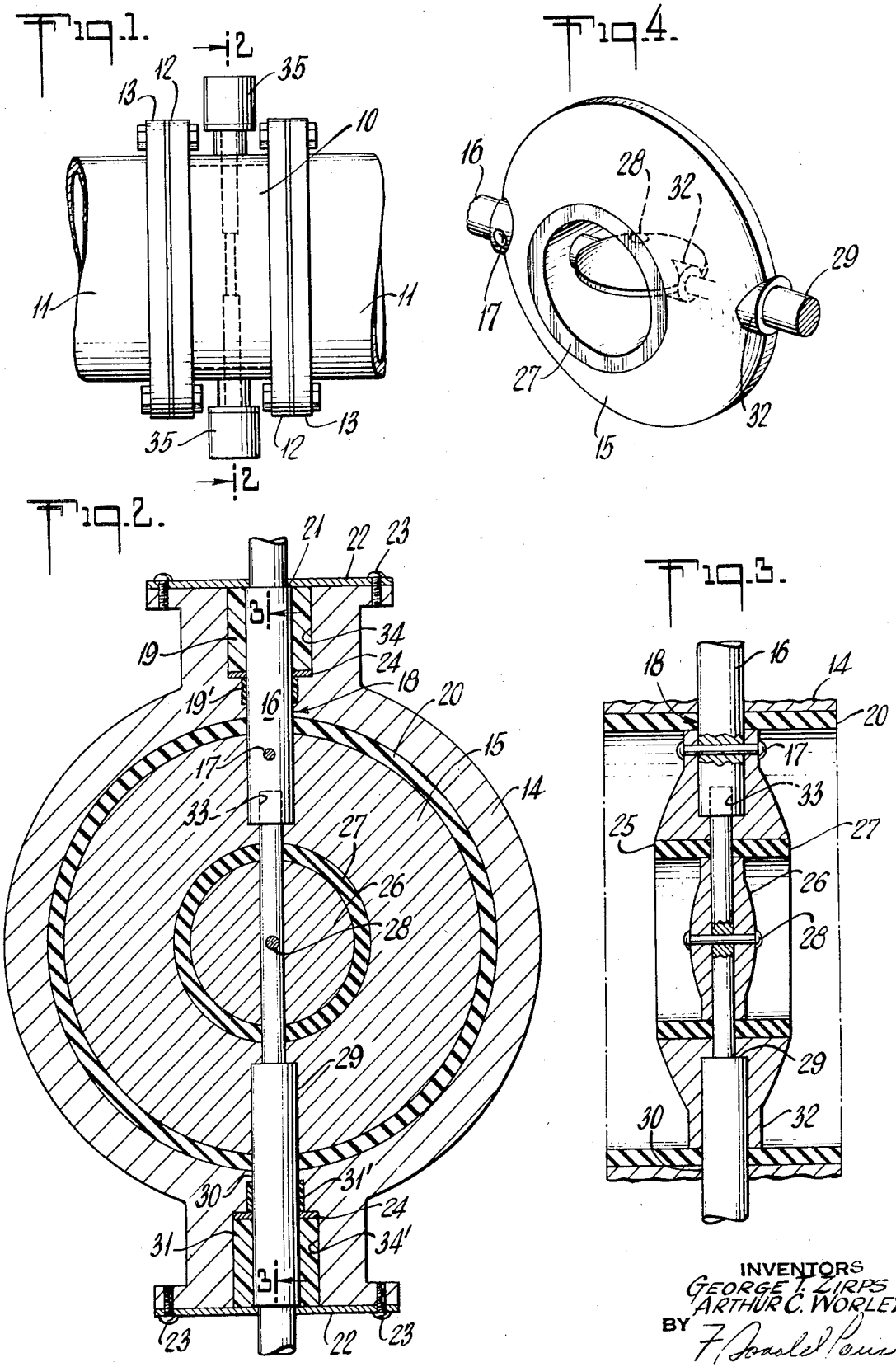

VERNIER THROTTLING/BLOCK VALVE

BACKGROUND OF THE INVENTION

1. Field of the Invention

The present invention relates to valves, and more particularly, to a novel and improved butterfly valve of the vernier throttling/block-type construction and arranged to provide a wide range of throttling capability and tight shutoff.

2. Description of the Prior Art

Heretofore, prior art valves intended for use in fluid service basically are designed primarily as valves and are not suitable for continuous high throttling service. Some of the prior art valves are typified by devices that include a secondary or auxiliary valve which operates together with a main valve in response to some external predetermined condition such as a pressure drop or a fluid flow, etc. Valve designs such as these do not provide an independent and positively controllable method of throttle flow. The auxiliary or secondary valves in the aforementioned designs react automatically in response to system induced conditions. Other prior art valve designs that offer some degree of wide range flow throttling are relatively complex in construction and require complete disassembly from service to permit access to the internals thereof to obtain the desired wide range capability. Additionally, numerous internal parts are required in the latter prior art devices in order to alter the flow range. One such prior art butterfly valve design is disclosed in the Sladky U.S. Pat. No. 2,412,918. The adjustable butterfly valve disclosed in Sladky comprises a plurality of concentrically disposed annular sections adapted for pivotal movement on a single shaft for manipulation of the valve sections. The size of the prior art valve opening may be determined by manually indexing a threaded boss nut so that the nut operably engages either both or one of the concentric sections, thereby rendering the engaged section or sections pivotably movable with the single shaft. This valve design is deficient for the reasons mentioned hereinbefore.

SUMMARY OF THE INVENTION

The present invention overcomes both these and other prior art deficiencies by providing a novel and improved butterfly valve, better defined in the instant disclosure as a vernier throttling/block valve. The valve comprises an auxiliary or secondary disc concentrically disposed for independent pivotal movement within an opening formed in a main disc with each of the discs being provided with separate and independently operable operator stems or shafts. This type of arrangement not only provides for a wide range of throttling capability, but also provides for a tight shutoff capability. According to the preferred embodiment of the present invention, the valve body is mounted in conventional fashion in a pipe for fluid service and comprises a pivotably mounted main disc formed with a central opening in which is pivotably mounted a smaller throttling disc. Each of the discs is provided with a separate stem for independently controlling the disposition of the main disc in the pipe and the position of the throttling disc relative to the main disc. By locating the throttling or auxiliary disc in radially spaced relation from the inner surface of the pipe in which the valve is mounted, the problem of erosion downstream of the valve is avoided because the turbulence that normally would occur in the vicinity of the downstream pipe surface is no longer present. With the present valve construction, provision is made for an infinite number of throttling positions and even under high throttling conditions, laminar flows (as compared to turbulent flows) will occur thereby precluding any significant valve and associated pipe damage. Any turbulence caused by high throttling will be quickly attenuated. The present valve design has a further advantage of being capable of fitting into existing butterfly valve bodies, since the additional stem required for the auxiliary valve will protrude through the hole provided for the bottom pivoting of the usual stem. The present valve design is cheap to manufacture and is simple to operate and maintain, and further it offers little resistance to flow when fully open. Thus, the present valve design will provide economical service life. Since the auxiliary or secondary disc of the present valve design does not operate in response to system induced conditions, in operating the present vernier throttling/block valve there can be obtained the exact flow required and a positive closing of the primary and secondary valve discs regardless of the prevailing system conditions. By virtue of the unique valve construction of the present invention the valve not only provides a wide range of throttling capability, but accomplishes this without the necessity for removal of the valves from service to obtain this capability and with a minimum number of internal parts.

Accordingly, it is a primary object of the present invention to provide a novel and improved butterfly valve that is of relatively simple design, highly economical, durable, and efficient, and that provides wide ranges of throttling capabilities as well as tight shutoff.

Another object of the present invention is to provide a novel and improved vernier throttling/block valve which can obtain the exact flow required as well as positive closing of the valve discs regardless of system conditions.

It is a further object of the present invention to provide a novel and improved vernier throttling/block valve having independently operable auxiliary and main discs, thereby to provide an infinite number of throttling positions with a tight shutoff capability.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings in which:

BRIEF DESCRIPTION OF THE DRAWINGS

FIG. 1 illustrates a vernier throttling/block valve, constructed in accordance with the present invention, mounted in a fully closed position in its intended environment;

FIG. 2 illustrates an enlarged cross-sectional view of the valve assembly taken substantially along the line 2—2 of FIG. 1;

FIG. 3 illustrates a cross-sectional view of the valve assembly taken substantially through its central axis denoted by the line 3—3 in FIG. 2; and FIG. 4 illustrates a perspective view of the valve assembly with the auxiliary disc disposed in its fully open position.

DESCRIPTION OF THE PREFERRED EMBODIMENT

A valve assembly generally designated 10 constructed according to the present invention is disclosed in FIG. 1 as being mounted in a pipe 11 for fluid service. It will be readily understood by those skilled in the art that although the presently preferred embodiment of the valve is disclosed with reference to operation in fluid service, the valve assembly has substantially broader utility and may be employed in various and other types of services.

With reference to the drawings wherein like reference characters refer to similar parts, there is illustrated in FIG. 1 the valve assembly 10, which may be more commonly referred to as a butterfly valve, mounted in the pipe 11 and provided with mounting flanges 12 at opposite ends thereof for mating with corresponding pipe flanges 13 to properly mount the valve in conventional fashion in the pipe. As best illustrated in FIG. 2, the valve comprises a conventional valve body 14 which may be of the wafer, flanged or otherwise suitable type. Within the valve body 14 there is pivotably mounted a main disc 15, preferably having a discus shape and an operator stem 16 secured for movement therewith by means of a lock pin 17 and extending radially outward of the valve body 14 through openings 18 and 34 (see FIGS. 2 and 3) provided therein. At the outer end of the main disc stem 16 there is provided a packing seal and a stem bearing generally designated 19 and 19' respectively for mounting the stem 16 in sealed relationship and permitting the desired turning movement of the stem, respectively. The bearing 19' may comprise any suitable type of material such as teflon, nylon or the like. Between the valve body 14 and the main disc 15 there is provided an annular seat 20 for the main disc. This seat 20 is secured to the interior of the valve body and may be made of a suitable material, such as rubber, and functions to provide a sealed mounting for the main disc when it is closed. At the outer periphery of the main disc in the vicinity of the stems there may be provided an annular strengthening hub in the form of ribs 32 (see FIG. 3). At the outer end of the stem 16 there is provided an annular shoulder 21 and a stem thrust plate 22 which abuts the shoulder 21 to hold the stem radially in place. The thrust plate 22 may be bolted by conventional means such as the bolts 23 to the valve body and together with a packing plate 24 maintains the packing seal in place.

The main disc 15 is provided with a central opening 25 for mounting an independently operable secondary or auxiliary disc 26, also being preferably discus-shaped. Along the periphery of the central opening 25 there is provided a disc seat or seal 27 for the auxiliary disc, which provides for vernier-type flow adjustment. The seat 27 is similar to the main disc seat 20 only smaller in diameter to accommodate the smaller auxiliary disc 26. The vernier disc 26 is mounted for turning movement by means of a lock pin 28 to a vernier throttling disc operator stem 29. The vernier throttling disc stem 29 extends radially outward through the valve body 15 through openings 30 and 34', which are diametrically disposed of and similar to the openings 18 and 34 for the main disc operator stem 16. The outer end of the vernier throttling disc operator stem 29 extends through the valve body and is secured in place in a manner similar to the main disc stem 16. A packing seal and stem bearing generally designated 31 and 31' are provided to permit turning movement of the stem and, thus, the vernier disc mounted for movement therewith. The other extremity of stem which is narrower than the outer end extends diagonally through and beyond the vernier disc 26 and journals in an opening 33 formed at the inner end of the main disc operator stem 16. Thus, it is seen that the main disc stem 16 and vernier disc stem 29 have a common mounting and turning axis which extends along the diameters of the discs 15 and 26. By so arranging the vernier stem and the main disc stem as discussed hereinbefore, each of the discs 15 and 26 may be operated independently of the other. The outer end of each of the stems is provided with operator means schematically shown at 35. The operators 35 may be of any suitable conventional type, such as a lever-type operator for each of the discs. Other possible ways of operating the discs may comprise a motor, a rack and pinion arrangement, or pneumatic or hydraulic means for operating each of the discs independently.

For purposes of understanding the present invention, the operation of the valve now will be described. When complete shutoff (no through-flow) is desired, the main disc 15 and the vernier throttling disc 26 are oriented in the positions as shown in FIGS. 1 and 2. When throttling is desired the vernier disc 26 may be placed manually or automatically, depending on the type of operator means employed, in any one of an infinite number of throttling positions, for example, see FIG. 4, by turning the vernier disc stem 29 the desired amount and thus, the desired amount of flow will be permitted to pass therethrough. If it is desired to have complete flow, then the vernier disc and the main disc may be disposed at right angles to their disposition as shown in FIG. 1. Thus, it is seen that even under high throttling conditions the flow immediately downstream of the valve will be laminar as compared to turbulent and thus, will not adversely affect the valve or the pipe, downstream of the valve. Although the butterfly valve constructed according to the present invention has been disclosed so as to permit independent operation of each of the discs 15 and 26, it is also within the scope of this invention to modify the construction and to provide for combined disc positioning. Such a construction may comprise an arrangement wherein external coupling of the operators or internal positioning devices are incorporated into the vernier and main discs discussed heretofore so as to operate the discs together in a predetermined manner. The operators may be coupled by mechanical, electrical, fluid and other means to obtain combined disc positioning. Both the external and internal positioning devices can be controlled to cause the discs to operate in a combined fashion, but with one disc moving before the other.

Numerous alterations of the structure herein disclosed will suggest themselves to those skilled in the art. However, it is to be understood that the present disclosure relates to a preferred embodiment of our invention which is for purposes of illustration only and it is not to be construed as a limitation of the invention. All such modifications which do not depart from the spirit of invention are intended to be included within the scope of the appended claims.

Having thus set forth the nature of this invention, what we claim herein is:

1. A butterfly valve comprising a valve body formed with an opening through which a fluid or the like may flow, a pair of oppositely disposed openings formed in said valve body, first and second shafts mounted for independent turning movement each extending through one of said openings, a main disc operably secured with said first shaft and movable therewith between opened and closed positions, said main disc being formed with an opening, an auxiliary disc disposed within said opening formed in said main disc, said auxiliary disc being operably secured to said second shaft for movement therewith independent of said main disc, thereby to provide positive flow control and a wide range of throttling capability.

2. A butterfly valve according to claim 1 wherein said first and second shafts have secured thereto at their outer extremities, operator means for selective independent operation of said shafts and the respective discs associated therewith.

3. A butterfly valve according to claim 2 wherein said operator means comprises automatically operable means.

4. A butterfly valve according to claim 1 wherein said first shaft is constructed and arranged at its inner end to have the inner end of said second shaft journaled therein, whereby said shafts are independently operable.

5. A butterfly valve according to claim 1 wherein said main disc and said auxiliary disc are concentrically mounted for independent operation.

6. A butterfly valve according to claim 1 wherein said main disc includes strengthening hubs disposed about said shafts.

7. A vernier throttling/block valve comprising, in combination, a valve body formed with an opening through which a fluid or the like may flow, a pair of diametrically opposed openings formed in said valve body, first and second shafts extending through said openings respectively, a main disc operably secured with said first shaft and pivotably movable therewith between open and closed positions, said main disc being formed with a central opening, an annular seal disposed about the periphery of said central opening, an auxiliary disc disposed within the opening defined by said annular seal, said auxiliary disc being operably secured with said second shaft for movement independent of said main disc and relative thereto, said first and second shafts having a common mounting axis for turning movement thereabout, whereby there is provided a wide range of throttling capability and a tight shutoff capability.

* * * * *